United States Patent
Benesty et al.

(10) Patent No.: US 7,136,437 B2
(45) Date of Patent: Nov. 14, 2006

(54) METHOD AND APPARATUS FOR RECEIVING DIGITAL WIRELESS TRANSMISSIONS USING MULTIPLE-ANTENNA COMMUNICATION SCHEMES

(75) Inventors: Jacob Benesty, Summit, NJ (US); Jingdong Chen, North Plainfield, NJ (US); Yiteng Arden Huang, North Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 811 days.

(21) Appl. No.: 10/196,865

(22) Filed: Jul. 17, 2002

(65) Prior Publication Data

US 2004/0013212 A1    Jan. 22, 2004

(51) Int. Cl.
    H04B 7/10    (2006.01)
(52) U.S. Cl. .................................. 375/347
(58) Field of Classification Search ............. 375/144, 375/148, 267, 346, 347, 349, 260; 455/132, 455/500, 553.1; 370/334
    See application file for complete search history.

(56) References Cited

U.S. PATENT DOCUMENTS 6,097,771 A    8/2000    Foschini .................. 375/346
6,317,466 B1    11/2001    Foschini et al. ............ 375/267
2004/0076248 A1*    4/2004    Purho ........................ 375/350

OTHER PUBLICATIONS

Fijany, Schur Complement Factorizations and Parallel O (Log N) Algorithms for Computation of Operational Space Mass Matrix and Its Inverse, 1994 IEEE, p. 2369-2376.*
Takei et al., A New Interpretation of Subspace Methods by Using Schur Complement, 2001 IEEE, p. 3924-3929.*
U.S. Appl. No. 09/438,900, filed Nov. 12, 1999, Hassibi.
Ouellette, Diane Valerie, Linear Algebra and its Applications, vol. 36, Mar. 1981, pp. 187-294.

* cited by examiner

Primary Examiner—Khanh Tran
Assistant Examiner—Sam K. Ahn
(74) Attorney, Agent, or Firm—Kenneth M. Brown

(57) ABSTRACT

A signal detection technique for multiple-input multiple-output (MIMO) communications systems embodied in a method and apparatus for detecting a plurality of transmitted signals with use of a plurality of receiving antennas. An iterative procedure decodes one of a plurality of transmitted signals at each iteration using an intermediate matrix at each iteration to determine the transmitted signal to be decoded. The intermediate matrix for each successive iteration is advantageously computed in a recursive manner with use of a Schur complement operation performed based on the inverse of a modified version of the intermediate matrix used in the previous iteration.

14 Claims, 5 Drawing Sheets

METHOD AND APPARATUS FOR RECEIVING DIGITAL WIRELESS TRANSMISSIONS USING MULTIPLE-ANTENNA COMMUNICATION SCHEMES

FIELD OF THE INVENTION

The present invention relates generally to the field of wireless radio-frequency communication systems, and more particularly to a method and apparatus for detecting transmitted signals in a digital wireless communication system employing multiple-antenna communications.

BACKGROUND OF THE INVENTION

Multiple-antenna communications systems, also known as Multiple-Input Multiple-Output (MIMO) systems, are known to be able to achieve very high spectral efficiencies in scattering environments, with no increase in bandwidth or transmitted power. In particular, it is known that such a multipath wireless channel is capable of huge capacities, provided that the multipath scattering is sufficiently rich and is properly exploited through the use of an appropriate processing architecture and multiple antennas (both at transmission and reception).

One such MIMO system is described, for example, in U.S. Pat. No. 6,097,771, issued on Aug. 1, 2000 to G. Foschini, entitled "Wireless Communications System Having A Layered Space-Time Architecture Employing Multi-Element Antennas." U.S. Pat. No. 6,097,771, which is commonly assigned to the assignee of the present invention, is hereby incorporated by reference as if fully set forth herein. The architecture described in U.S. Pat. No. 6,097,771 has been shown to be theoretically capable of approaching the Shannon capacity for multiple transmitters and receivers. (As is well-known to those of ordinary skill in the art, the Shannon capacity of a system refers to the information-theoretic capacity limit of the system.)

Another such MIMO system is described, for example, in U.S. Pat. No. 6,317,466, issued on Nov. 13, 2001 to G. Foschini et al., entitled "Wireless Communications System Having A Space-Time Architecture Employing Multi-Element Antennas At Both The Transmitter And Receiver" (hereinafter "Foschini et al."). U.S. Pat. No. 6,317,466, which is also commonly assigned to the assignee of the present invention, is also hereby incorporated by reference as if fully set forth herein. The architecture described in Foschini et al, provides for a technique having a significantly lower computational complexity than that of U.S. Pat. No. 6,097,771, but which nonetheless can still achieve a substantial portion of the Shannon capacity.

Specifically, in the system of Foschini et al, a data stream is split into M uncorrelated sub-streams of symbols, each of which is transmitted by one of M transmitting antennas. The M sub-streams are picked up by N receiving antennas after having been perturbed by a channel matrix H. (The channel matrix H represents the signal interference or signal loss which naturally occurs as a result of the transmission channel.) The sub-stream signal with the highest signal-to-noise ratio is advantageously detected first and this involves the calculation of the pseudo-inverse of H or the calculation of a minimum mean-square error filter. The effect of the detected symbol as well as the effect of the corresponding transmission channel is then advantageously removed (mathematically) from the N received signals. This process repeats with the next strongest sub-stream signal among the remaining undetected signals. Thus, this approach detects M symbols (one from each of the M sub-streams) in M iterations. Moreover, it has been proven that this decoding order is optimal from a performance point of view. However, the computational complexity of the Foschini et al, technique is still reasonably high (albeit lower than that of U.S. Pat. No. 6,097,771).

This complexity problem was addressed, for example, in U.S. Pat. No. 6,600,796, issued on Jul. 29, 2003 to B. Hassibi, entitled "Method And Apparatus For Receiving Wireless Transmissions Using Multiple-Antenna Arrays" (hereinafter "Hassibi"). U.S. Pat. No. 6,600,796 is commonly assigned to the assignee of the present invention and is hereby incorporated by reference as if fully set forth herein. In Hassibi, it was recognized that mathematical matrix inversion operations are inherently costly (in computational complexity), and, making use of that recognition, an improved technique for detecting the M transmitted signals was disclosed. In particular, in the technique of Hassibi, as each transmitted symbol is detected the effect of the detected symbol and of the corresponding channel is advantageously subtracted from the N received signals without performing any mathematical matrix inversion operations.

Although the prior art techniques such as that of Foschini et al, and especially that of Hassibi have considerably reduced the computational complexity of the signal detection process for MIMO systems over the earlier techniques, their complexity nonetheless rises significantly as the number of antennas grow. That is, while reasonably efficient when used with a modest number of antennas, these techniques become more cumbersome particularly when the number of transmitting antennas becomes large (e.g., greater than 10). Therefore, an improved signal detection technique for MIMO systems, whose computational complexity does not increase as quickly with increasing numbers of antennas, would be highly desirable.

SUMMARY OF THE INVENTION

In accordance with the present invention, an improved signal detection technique for MIMO systems is embodied in a method and apparatus for detecting a plurality of transmitted signals with use of a plurality of receiving antennas. In particular, and in accordance with one illustrative embodiment of the present invention, an iterative procedure decodes one of a plurality of transmitted signals at each iteration using an intermediate matrix at each iteration to determine the transmitted signal to be decoded. The intermediate matrix for each successive iteration is advantageously computed in a recursive manner with use of a Schur complement operation performed based on the inverse of a modified version of the intermediate matrix used in the previous iteration. (A Schur complement is a well-known matrix operation fully familiar to those skilled in the art.)

More specifically, a method and apparatus for detecting a plurality of transmitted signals transmitted across a channel by respective transmitting antenna elements in a multiple-input multiple-output communications system is provided. The method, for example, comprises the steps of (a) collecting a plurality of received signals from respective receiving antenna elements in said communications system; (b) determining a channel matrix H of estimated channel coefficients based on said plurality of received signals; (c) computing an estimate of a selected one of said transmitted signals, said estimate based on said plurality of received signals and on an intermediate matrix Q, thereby resulting in detection of the selected one of said transmitted signals, wherein said intermediate matrix Q is a function of the channel matrix H; and (d) repeating at least step (c) one or more times to detect an additional one or more of said transmitted signals, wherein said intermediate matrix Q as used in step (c) for each such repeated execution thereof is re-computed based on a function of an inverse of a Schur complement of an element in the inverse of a modified version of the intermediate matrix Q used in the previous execution of step (c).

DETAILED DESCRIPTION

An Overview of an Illustrative MIMO System Architecture

Figure 1:
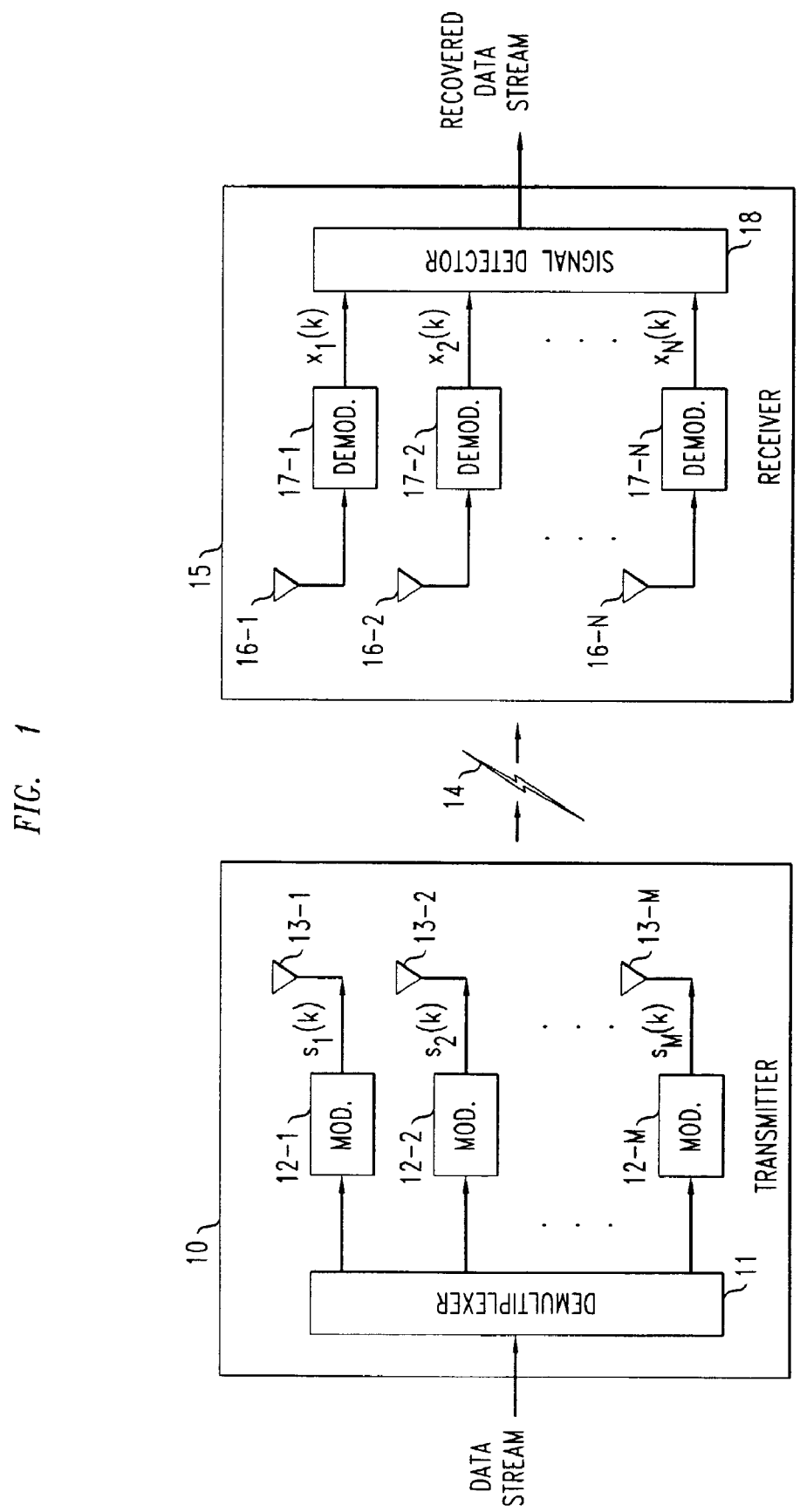
FIG. 1 shows an illustrative MIMO system architecture in which an illustrative embodiment of the present invention may be advantageously employed.

FIG. 1 shows an illustrative MIMO system architecture in which an illustrative embodiment of the present invention may be advantageously employed. As shown in the figure, a single data stream is transmitted across a wireless channel with use of a communications link comprising M transmitting antennas and N receiving antennas. The channel is advantageously presumed to be a Rayleigh channel, familiar to those of ordinary skill in the art. In particular, the channel is flat-fading (meaning that the signals are narrow-band), and it is presumed that there is no Inter-Symbol Interference (ISI) between adjacent symbols.

The figure shows transmitter 10, channel 14 and receiver 15. Specifically, demultiplexer 11 of transmitter 10 separates the data stream into M uncorrelated data sequences which are then modulated by modulators 12-1 through 12-M respectively into M substreams, $s_1(k), \ldots, s_M(k)$, each of which is then sent through corresponding transmitting antennas 13-1 through 13-M. After traversing channel 14 (whose behavior is represented by the matrix H—see discussion of FIG. 2, below), the transmitted signals are captured by receiver 15, specifically comprising receiving antennas 16-1 through 16-N and corresponding demodulators 17-1 through 17-N, which produce intermediate signals $x_1(k)$ through $x_N(k)$, respectively. Then, in accordance with the principles of the present invention, signal detector 18 generates the recovered data stream from intermediate signals $x_1(k)$ through $x_N(k)$ in accordance, for example, with an illustrative embodiment of the present invention.

Figure 2:
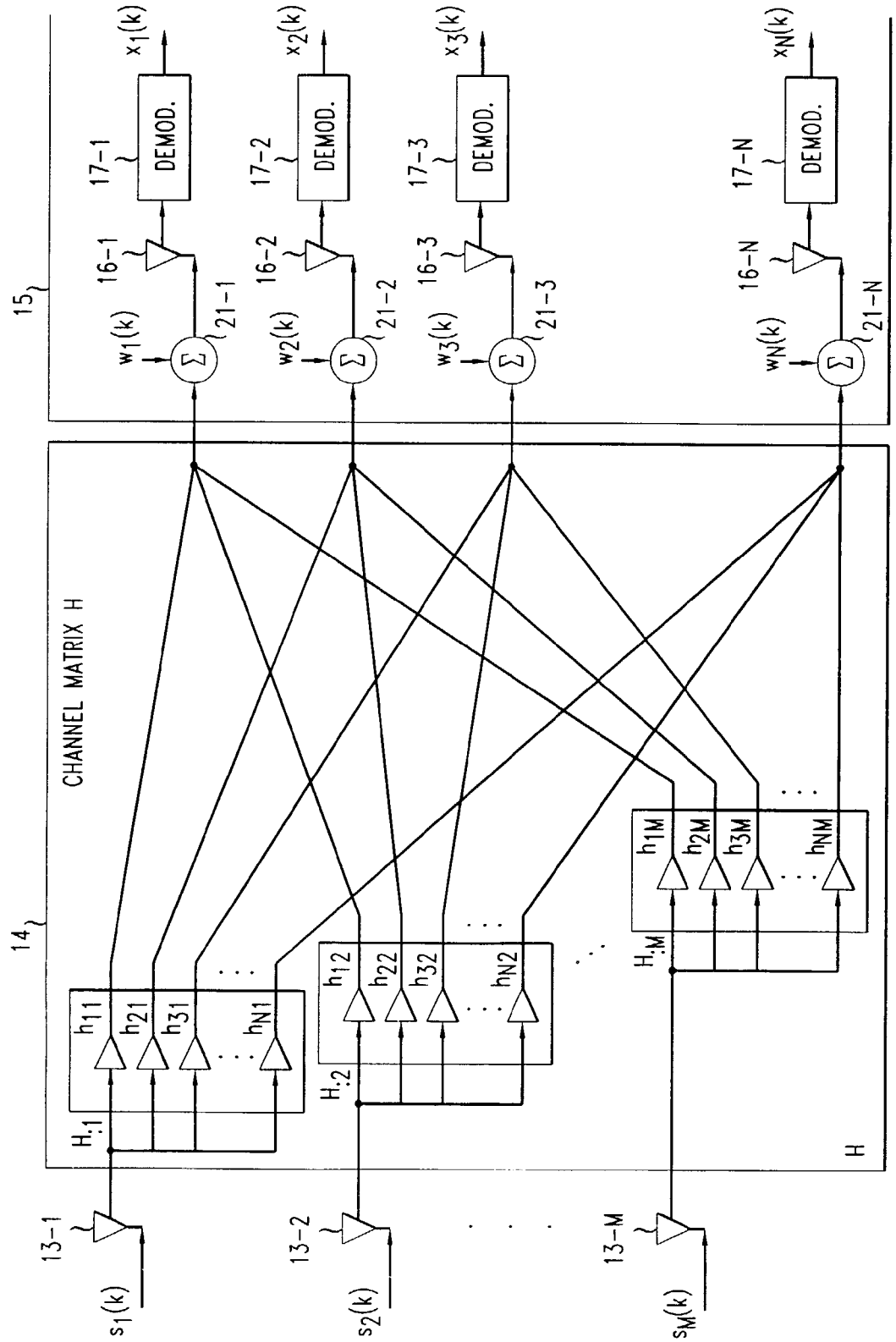
FIG. 2 shows an illustration of a how the transmission channel for a MIMO system may be represented as a channel matrix in accordance with an illustrative embodiment of the present invention.

FIG. 2 shows an illustration of a how the transmission channel for a MIMO system may be represented as a channel matrix in accordance with an illustrative embodiment of the present invention. In particular, the figure shows transmitting antennas 13-1 through 13-M, used to transmit signals $s_1(k), s_2(k), \ldots, s_M(k)$, respectively; channel matrix H representative of transmission channel 14; and the portion of receiver 15 comprising receiving antennas 16-1 through 16-N and corresponding demodulators 17-1 through 17-N, which produce intermediate signals $x_1(k)$ through $x_N(k)$, respectively. Also shown are summation elements 21-1 through 21-N which represent the (unavoidable) inclusion of noise signals $w_1(k)$ through $w_N(k)$, respectively, into the signals received by receiving antennas 16-1 through 16-N.

Specifically, channel matrix H comprises channel vectors $h_{:1}$ through $h_{:M}$, representing the channel's effect on each of the M transmitted signals, respectively. More specifically, channel vector $h_{:1}$ comprises channel matrix entries $h_{11}$ through $h_{N1}$, representing the channel's effect on transmitted signal $s_1(k)$ at each of receiving antennas 16-1 through 16-N, respectively; channel vector $h_{:2}$ comprises channel matrix entries $h_{12}$ through $h_{N2}$, representing the channel's effect on transmitted signal $s_2(k)$ at each of receiving antennas 16-1 through 16-N, respectively, . . . , and channel vector $h_{:M}$ comprises channel matrix entries $h_{1M}$ through $h_{NM}$, representing the channel's effect on transmitted signal $s_M(k)$ at each of receiving antennas 16-1 through 16-N, respectively.

The operation of the illustrative MIMO architecture is described more formally, below. First, at the receivers, at sample time k, we have:

$$x(k) = \sum_{m=1}^{M} h_{:m} s_m(k) + w(k) \qquad (1)$$
$$= Hs(k) + w(k), \quad k = 1, 2, \ldots K,$$

where $$x(k) = [\, x_1(k) \quad x_2(k) \quad L \quad x_N(k) \,]^T$$
$$= [\, h_{1:}^H s(k) + w_1(k) \quad h_{2:}^H s(k) + w_2(k) \quad L \quad h_{N:}^H s(k) + w_N(k) \,]^T$$

is the N-dimensional received vector, $$H = \begin{bmatrix} h_{11} & h_{12} & L & h_{1M} \\ h_{21} & h_{22} & L & h_{2M} \\ M & M & O & M \\ h_{N1} & h_{N2} & L & h_{NM} \end{bmatrix}$$
$$= [\, h_{:1} \quad h_{:2} \quad L \quad h_{:M} \,]$$
$$= \begin{bmatrix} h_{1:}^H \\ h_{2:}^H \\ M \\ h_{N:}^H \end{bmatrix}$$

is an N×M complex matrix assumed to be constant for K symbol periods, vectors $h_{n:}$ and $h_m$ are respectively of length M and N, $$s(k) = [s_1(k) s_2(k) L\; s_M(k)]^T$$

is the M-dimensional transmitted vector, $$w(k) = [w_1(k) w_2(k) L\; w_N(k)]^T$$

is a zero-mean complex additive white Gaussian noise (AWGN) vector with covariance $$R_{ww} = E\{w(k)w^H(k)\} \qquad (2)$$
$$= \sigma_w^2 I_{N \times N},$$

and $^T$ and $^H$ denote respectively the transpose and the conjugate transpose of a matrix or a vector, and where $I_{N \times N}$ represents the N×N identity matrix. (It will be assumed herein that the additive noise w(k) is independent both in time and space.)

The transmitted vector s(k) has a total power $P_T$. This power is advantageously held constant regardless of the number of transmitting antennas M and corresponds to the trace of the covariance matrix of the transmitted vector:

$$P_T = \operatorname{tr}[R_{ss}] = \text{Constant} \qquad (3)$$
$$= \sum_{m=1}^{M} \sigma_{s_m}^2.$$

It will be assumed herein that all of the antennas transmit with the same power, $$\sigma_{s_1}^2 = \sigma_{s_2}^2 = K \sigma_{s_M}^2 = \sigma_s^2,$$

such that $$P_T = M \sigma_s^2. \qquad (4)$$

Now define a parameter $\rho$ that relates $P_T$ and $\sigma_w^2$ as follows:

$$\rho = \frac{P_T}{\sigma_w^2} \qquad (5)$$

This parameter advantageously corresponds to the average receive signal-to-noise ratio (SNR) per antenna.

Therefore, in accordance with the principles of the present invention, an original information sequence for wireless transmission is demultiplexed into M data sequences $s_m(k)$, m=1, ..., M (called substreams), and each one of them is sent through a transmitting antenna. These M substreams are assumed to be uncorrelated, which implies that the covariance matrix of the transmitted vector s(k) is diagonal:

$$R_{ss} = E\{s(k)s^H(k)\} \qquad (6)$$
$$= \sigma_s^2 I_{M \times M}$$

Also assume that $N \geq M$ and that H has full column rank, i.e., that rank[H]=M.

Assume that the transmitter has no knowledge of the channel. In this case, the Shannon capacity of the (M, N) flat-faded channel is given by the following well-known formula, familiar to those skilled in the art:

$$C = \log_2\left[\det\left(I_{N \times N} + \frac{\rho}{M} H H^H\right)\right] \text{[bps/Hz]} \qquad (7)$$

-continued
$$= \log_2\left[\det\left(I_{M \times M} + \frac{\rho}{M} H^H H\right)\right].$$

One important observation that can be made from Equation (7) is that, for rich scattering channels (meaning that the elements of the channel matrix are independent of one another), the MIMO channel capacity grows roughly proportionally to M.

An Illustrative MIMO Signal Detection Technique

In a MIMO system such as the illustrative system shown in FIG. 1, the detection of the transmitted symbols at the receivers typically comprises first determining the value of the complex channel matrix H, or, more precisely, an estimate thereof. Most typically, and as is well known to those skilled in the art, H is determined by having the transmitter send a training sequence (comprising a sequence of symbols which is known in advance by the receiver) at the beginning of each burst. (As is also well known, most communications systems separate the sequence of symbols to be transmitted into individual portions referred to as bursts.) The length of a burst is advantageously equal to $K=K_1+K_2$ symbols where the $K_1$ symbols are used for training and the $K_2$ symbols are used for the transmission of the actual data information. The propagation coefficients (i.e., the values of the elements of the matrix H) may then be assumed to be constant during an entire burst (since it occurs over a reasonably short period of time), after which they may change to new independent random values which it is assumed they maintain for another K symbols, and so on. Note that no distinction will be made between H and its estimate herein.

Thus, given the channel matrix H and the set of received signals x(k) as described above, the goal of a MIMO system is to determine (or, more precisely, to estimate) the transmitted signals s(k). Note in particular that the transmitted signals s(k) have been coded (illustratively by modulators 12-1 through 12-M of FIG. 1) with use of a predetermined symbol constellation, and therefore, the estimates of the transmitted signals (which will be referred to herein as $\hat{s}(k)=[\hat{s}_1 \hat{s}_2 L \hat{s}_M]^T$) should fall into that constellation.

As is well know to those skilled in the art, one general approach to the problem of signal detection in MIMO systems comprises a Sequential Nulling and Cancellation (SNC) technique, such as is described, for example, in Foschini et al. An SNC technique typically consists of performing the following steps:

1. The M transmitted signals are first estimated by filtering the N received signals using, for example, either the well-known minimum mean-square-error (MMSE) filtering technique or the well-known zero forcing (ZF) technique. In either case, an estimation matrix (which we will identify herein as G) is the mathematical result.

2. Among the M estimated source signals, the substream with the smallest estimation variance or the strongest SNR is chosen for detection.

3. The interference contributed by the detected substream is cancelled (removed or "subtracted out") from the N received signals.

4. Return to step 1 and repeat with the number of substreams advantageously reduced by one, until all substreams have been detected.

Thus, it can be seen that with M iterations, each of the substreams are advantageously detected.

Figure 3:
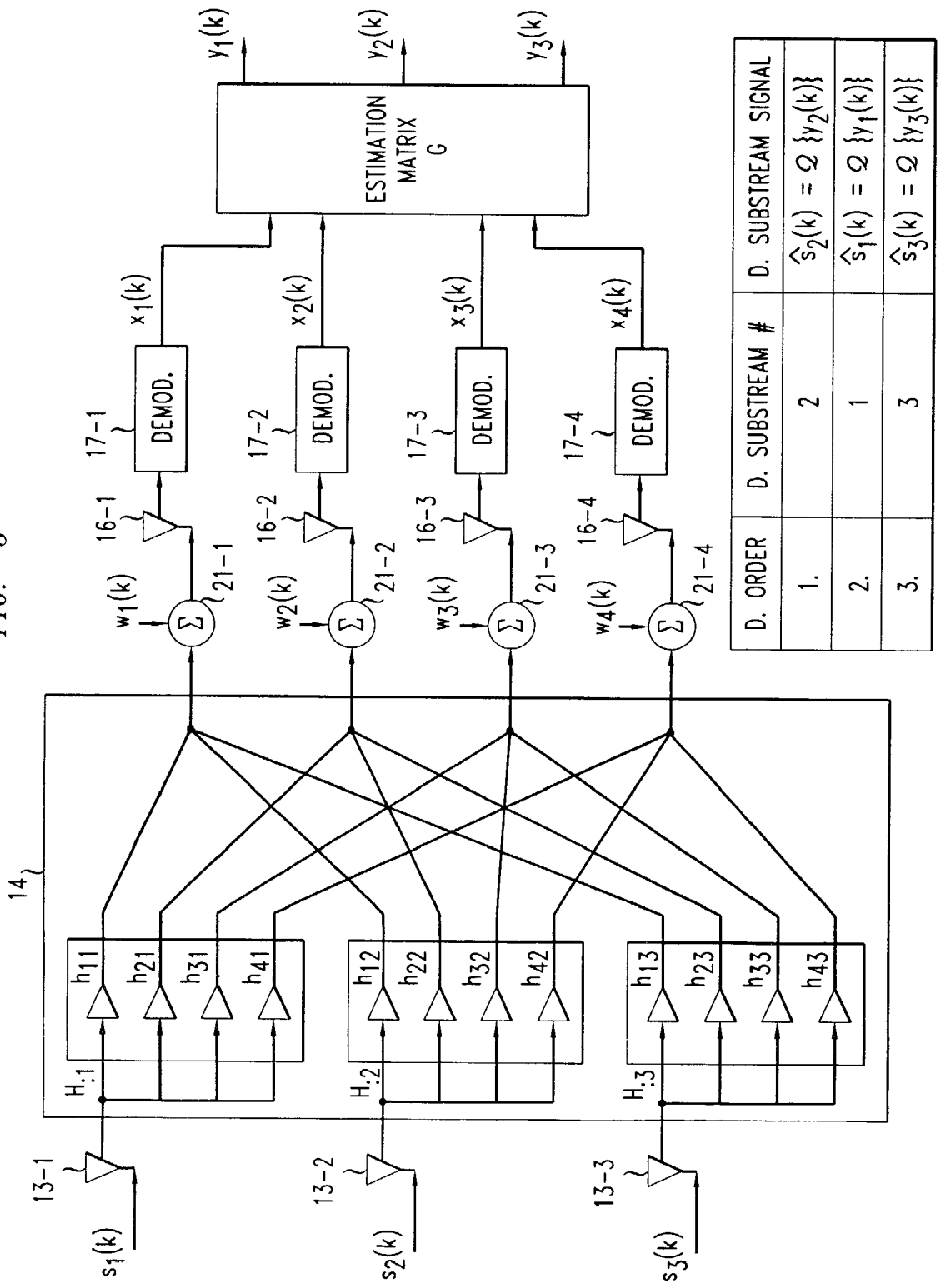
FIG. 3 shows an illustration of how an estimation matrix may be advantageously used to decode the plurality of transmitted signals in accordance with an illustrative embodiment of the present invention.

FIG. 3 shows an illustration of how an estimation matrix may be advantageously used to decode the plurality of transmitted signals in accordance with an illustrative embodiment of the present invention. Illustratively, the figure shows a MIMO environment with three transmitting antennas and four receiving antennas. (That is, in accordance with the description provided herein, M=3 and N=4.) Note that the use of an estimation matrix as shown in FIG. 3 is a characteristic of both certain prior art MIMO signal detection schemes and certain MIMO signal detection schemes in accordance with various illustrative embodiments of the present invention.

As shown in the figure, estimation matrix 31 (G), which may be advantageously determined with use of either the MMSE technique or the ZF technique, is used to compute the estimates of the transmitted signals. In particular the signal vector y(k) is computed as $y(k)=G^H x(k)$ at each iteration of the SNC process. Then, as each substream, $y_i(k)$, for some i (which represents the substream with the smallest estimation variance or the strongest SNR) is detected in turn, the corresponding estimate of the transmitted signal may be advantageously determined by computing $\hat{s}_i(k)=Q\{y_i(k)\}$, where Q[·] represents the quantization procedure according to the constellation being used. As further shown in the figure, substream 2 is illustratively detected first, followed by substream 1 and finally by substream 3.

A Prior Art MIMO Signal Decoding Technique

Figure 4:
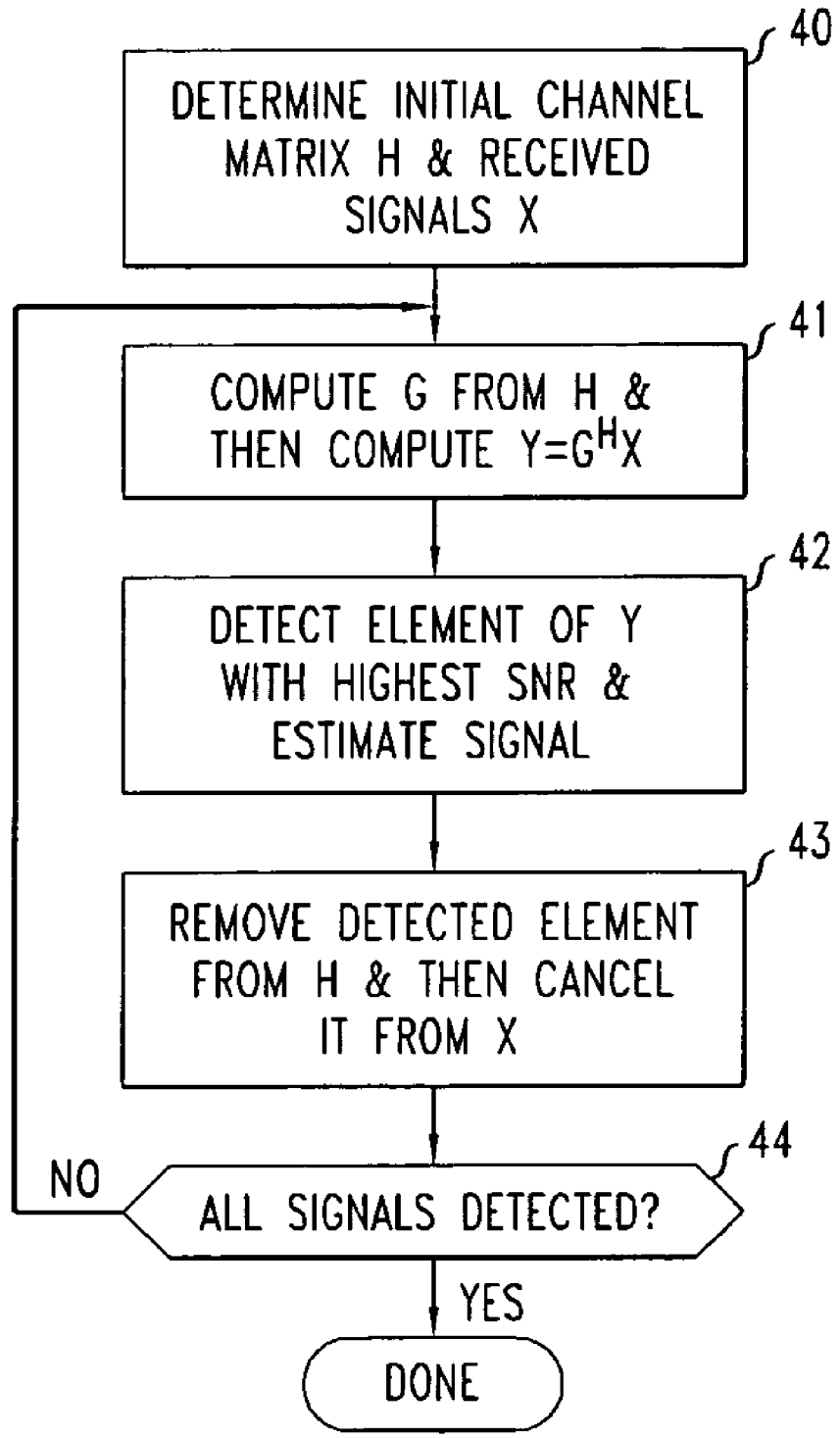
FIG. 4 shows a flowchart of a sequential nulling and cancellation scheme for use in decoding the plurality of transmitted signals in accordance with a prior art technique.

FIG. 4 shows a high-level flowchart of a sequential nulling and cancellation scheme for use in decoding the plurality of transmitted signals in accordance with a prior art technique. In this prior art technique, the estimation matrix (e.g., estimation matrix 31, G, as shown in FIG. 3) is computed with use of either the pseudo-inverse of the channel matrix H or, preferably, the MMSE filter G. In particular, define an error vector signal at time k between the input s(k) and its estimate:

$$e(k) = s(k) - y(k) \quad (8)$$
$$= s(k) - G^H x(k).$$

Now, define the error criterion:

$$J = E\{e^H(k)e(k)\} \quad (9)$$
$$= \text{tr}[E\{e(k)e^H(k)\}].$$

The minimization of Equation (9) leads to the Wiener-Hopf equation, familiar to those skilled in the art—namely:

$$G^H R_{xx} = R_{sx}, \quad (10)$$

where $$R_{xx} = E\{x(k)x^H(k)\} \quad (11)$$

is the output signal covariance matrix, and $$R_{sx} = E\{s(k)x^H(k)\} \quad (12)$$

is the cross-correlation matrix between the input and output signals.

From Equation (10), it can be seen that the MMSE filter is:

$$G = [HH^H + \alpha I_{N \times N}]^{-1} H, \quad (13)$$

where $$\alpha = \frac{\sigma_w^2}{\sigma_s^2}. \quad (14)$$

It can easily be seen that Equation (13) is equivalent to:

$$G = H[H^H H + \alpha I_{M \times M}]^{-1} \quad (15)$$
$$= HQ.$$

The second form—that is, Equation (15)—is more useful and more efficient in practice since M≦N and the size of the matrix to be inverted in Equation (15) is either smaller than or equal in size to the matrix to be inverted in Equation (13).

Instead of the MMSE filter, a prior art SNC technique can alternatively directly use the pseudo-inverse (familiar to those skilled in the art) of H, which is:

$$G_{PI}^H = [H^H H]^{-1} H^H \quad (16)$$

As can easily be seen, the only difference between the matrices G and $G_{PI}$ is that the G is "regularized" by a diagonal matrix $\alpha I_{M \times M}$ while $G_{PI}$ is not. This regularization introduces a bias but Equation (15) actually gives a much more reliable result than Equation (16) when the matrix $H^H H$ is ill-conditioned and the estimation of the channel is noisy. In practice, depending on the condition number of the matrix $H^H H$, a different value may be used for α than the one given in Equation (14). For example, if this condition number is very high and the SNR is also high, it will be better to take a higher value for α. Thus, the MMSE filter can be seen as a biased pseudo-inverse of H.

More specifically, in the prior art SNC algorithm being described, the detection of the symbols $s_m(k)$ is performed over M iterations. Note that the order in which the components of s(k) are detected is important to the overall performance of the system. Let the ordered set $$S = \{p_1, p_2, L, p_M\} \quad (17)$$

be a permutation of the integers 1, 2, . . . , M specifying the order in which components of the transmitted symbol vector s(k) are extracted.

Thus, returning to FIG. 4, the illustrative prior art SNC technique comprises the following steps.

Initialization Step (as Shown in Block 40 of the Figure):

Use the training sequence to determine the matrix H and set the initial matrix $H_M = H$ for the first iteration. Also, determine the received signals x(k) and set $x_1(k)=x(k)$ for the first iteration.

Step 1 (as Shown in Block 41 of the Figure):

Using the MMSE filter or the pseudo-inverse, compute:

$$y(k) = G^H x(k). \quad (18)$$

(Note that y(k) represents the estimates of the transmitted signals.) In particular, if using the MMSE filter approach, matrix G is computed by Equation (13) above; is using the zero-forcing approach, matrix G is computed by Equation (16) above. In addition, x(k) and H are determined in the initialization sequence for the first iteration, and as described below (with reference to block 44 of the figure) for all subsequent iterations.

Step 2 (as Shown in Block 42 of the Figure):

The element of y(k) with the highest SNR is detected. This element is associated with the smallest diagonal entry of Q for the MMSE filter (as will be more clearly explained below), or the column of G having the smallest norm for the pseudo-inverse (in the case where zero-forcing has been used). For example, if such a column determined in the m'th iteration is $p_m$, then the estimate of the chosen transmitted signal is given by:

$$\hat{s}_{p_m}(k) = Q[y_{p_m}(k)], \quad (19)$$

with Q[·] indicating the slicing or quantization procedure in accordance with the given symbol constellation in use.

Step 3 (as Shown in Block 43 of the Figure):

Assuming that $\hat{s}_{p_m}(k) = s_{p_m}(k)$, then $s_{p_m}(k)$ is cancelled from the received vector x(k), resulting in a modified received vector, namely:

$$x_2(k) = x(k) - s_{p_1}(k)h_{:,p_1} \quad (20)$$
$$= \sum_{m \neq p_1} h_{:,m} s_m(k) + w(k)$$
$$= H_{M-1} s_{M-1}(k) + w(k),$$

where $H_{M-1}$ is an N×(M−1) matrix derived from H by removing its $p_1$'th column and $s_{M-1}(k)$ is a vector of length M−1 obtained from s(k) by removing its $p_1$'th component.

Step 4 (as Shown in Block 44 of the Figure):

Unless all M transmitted signals have already been decoded, steps 1–3 are repeated for components $p_2, L, p_M$ by operating in turn on the progression of modified received vectors $x_2(k), L, x_M(k)$. Note that at the m'th iteration, the N×(M−m) matrix $H_{M-m}$ may be derived from H by removing m of its columns—namely, columns $p_1, L, p_m$. It is well known that this ordering (i.e., choosing the transmitted signal having the highest SNR at each iteration in the detection process) is optimal among all possible orderings.

Figure 5:
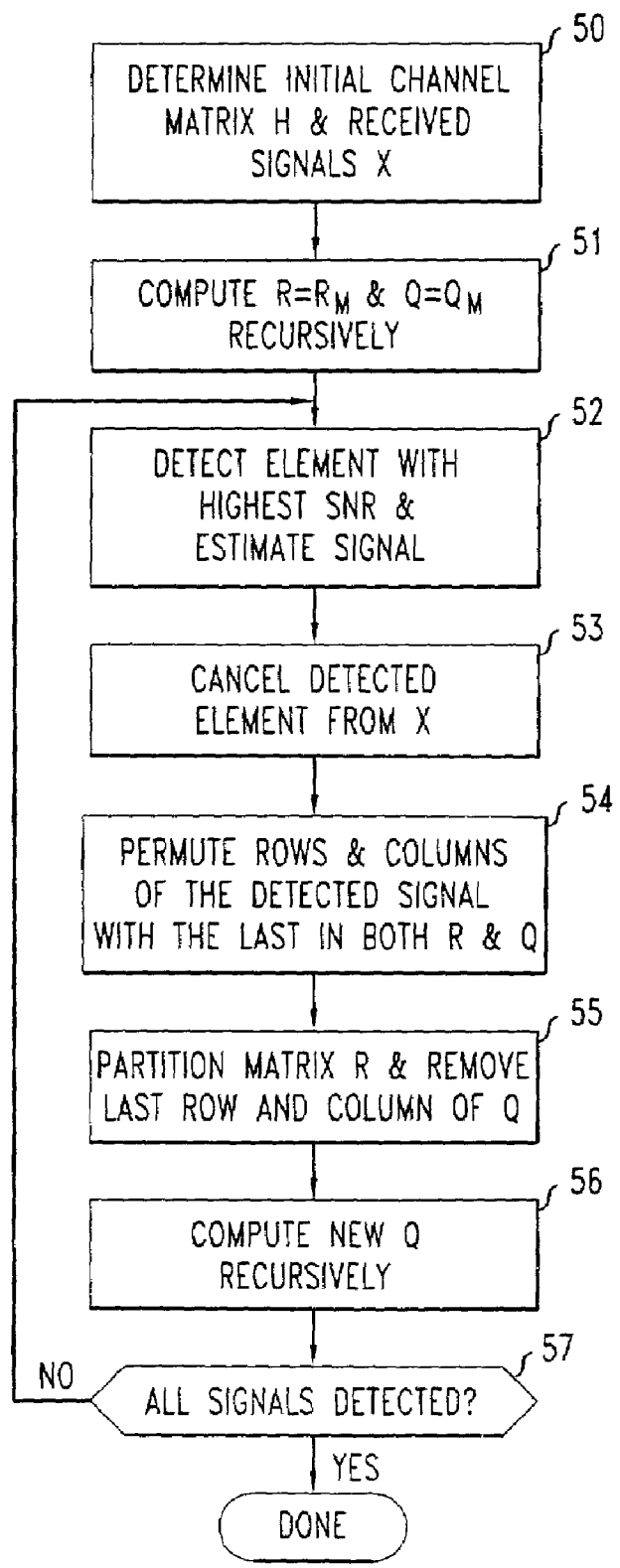
FIG. 5 shows a flow chart of a sequential nulling and cancellation scheme for use in decoding the plurality of transmitted signals in accordance with an illustrative embodiment of the present invention.

The following more formally summarizes the illustrative prior art SNC algorithm (using the MMSE filter):

Initialization and First Iteration:

$x_1(k) = x(k), H_M = H = [h_{M,:1} h_{M,:2} L\ h_{M,:M}]$ $Q_M = [q_{M,:1} q_{M,:2} L\ q_{M,:M}] = [H_M^H H_M + \alpha I_{M \times M}]^{-1}$ $f(k) = [1\ 2L\ M]^T$ $l_1 = \arg\min q_{M,:ii},\ p_1 = f_{l_1}(k)$ $y_{p_1}(k) = q_{M,:l_1}^H H_M^H x_1(k)$ Move the $l_1$'th entry of vector f(k) to the end $\hat{s}_{p_1}(k) = Q[y_{p_1}(k)]$ Recursion (i.e., Subsequent Iterations), for m=1,2,K,M−1:
(a) $x_{m+1}(k) = x_m(k) - \hat{s}_{p_m}(k) h_{M,:l_m}$
(b) Determine $H_{M-m}$ by removing the $l_m$'th column of $H_{M-m+1}$ (c) $Q_{M-m} = [H_{M-m}^H H_{M-m} + \alpha I_{(M-m) \times (M-m)}]^{-1}$ (d) $I_{m+1} = \arg\min q_{M-m,ii},\ p_{m+1} = f_{l_{m+1}}(k)$ (e) $y_{p_{m+1}}(k) = q_{M-m,l_{m+1}}^H H_{M-m}^H x_{m+1}(k)$ (f) Move the $l_1$'th entry of vector f(k) to the position behind the (M−m)'th entry (g) $\hat{s}_{p_{m+1}}(k) = Q[y_{p_{m+1}}(k)]$ Solutions:

The estimates of the transmitted signals: $[\hat{s}_{p_1}(k)\ \hat{s}_{p_2}(k) L \hat{s}_{p_M}(k)]^T$ The decoding order: $f(k) = [p_M p_{M-1} L p_1]^T$ An Illustrative MIMO Decoding Technique According to the Present Invention FIG. 5 shows a flow chart of a sequential nulling and cancellation scheme for use in decoding the plurality of transmitted signals in accordance with an illustrative embodiment of the present invention. In accordance with the illustrative embodiment of the present invention, the matrix G is advantageously computed indirectly (rather than directly). Specifically, recall that:

$$G = HR^{-1} \quad (21)$$

where $$R = H^H H + \alpha I_{M \times M} \quad (22)$$

The covariance matrix of the error signal, e(k)=s(k)−y(k), is:

$$R_{ee} = E\{e(k)e^H(k)\} \quad (23)$$
$$= \sigma_w^2 R^{-1}$$
$$= \sigma_2^w Q.$$

Clearly, the element of y(k) with the highest SNR is the one with the smallest error variance, so that:

$$p_1 = \arg\min_m q_{mm}, \quad (24)$$

where $q_{mm}$ are the diagonal elements of the matrix $Q = R^{-1}$.

The matrix R can be rewritten as follows:

$$R = \sum_{n=1}^{N} h_{n:} h_{n:}^H + \alpha I_{M \times M}, \quad (25)$$

which means that R can be advantageously computed recursively in N iterations, as follows:

$$R_{[l]} = \sum_{n=1}^{l} h_{n:} h_{n:}^H + \alpha I_{M \times M} \quad (26)$$
$$= R_{[l-1]} + h_{l:} h_{l:}^H$$

and $$R_{[N]} = R,\ R_{[0]} = \alpha I_{M \times M} \quad (27)$$

Using the Sherman-Morrison formula (a well-known mathematical transformation fully familiar to those skilled in the art and also known as the "second lemma inversion"), Q can also be computed recursively, as follows:

$$Q_{[i]} = Q_{[i-1]} - \frac{Q_{[i-1]}h_{i:}h_{i:}^H Q_{[i-1]}}{1 + h_{i:}^H Q_{[i-1]}h_{i:}}. \quad (28)$$

With the initialization $$Q_{[0]} = \frac{1}{\alpha}I_{M \times M},$$

we obtain $$Q_{[N]} = [H^H H + \alpha I_{M \times M}]^{-1}.$$

Note that if the process begins at iteration M+1 with the initialization $$Q_{[M]} = \sum_{n=1}^{M} h_n h_n^H,$$

we obtain $$Q_{[N]} = [H^H H]^{-1}.$$

Note that it is well known that the computation of any recursion introduces potential numerical instabilities because of the finite precision of processor units. This instability however occurs only after a very large number of iterations. Since, in this case, the number of iterations to compute Q is limited by the number of receiving antennas N, such numerical instabilities are unlikely to occur. In any event, the numerical stability can be advantageously improved by increasing the value of $\alpha$ at the time of initialization.

Note also that in accordance with the illustrative embodiment of the present invention as described herein, Equation (28) is advantageously computed only one time at the first iteration. Once $Q_{[N]}$ is computed, $p_1$ may be easily determined based on Equation (24) above.

Now, continuing the illustrative process for the first iteration, the input estimate may be computed as follows:

$$y_{p_1}(k) = \sum_{m=1}^{M} q_{p_1,m} h_{:m}^H x(k) \quad (29)$$

and $$\hat{s}_{p_1}(k) = Q[y_{p_1}(k)]. \quad (30)$$

Note that the last step of the illustrative decoding procedure in accordance with the present invention is the same as the last step ("Step 3") of the prior art approach described above.

For each of the following iterations (after the first), the process is as follows. First, note that the matrix Q can advantageously be deflated recursively. Specifically, note that:

$$Q_{[N]} = Q = [H^H H + \alpha I_{M \times M}]^{-1} = R^{-1} \quad (31)$$

-continued $$= \begin{bmatrix} h_{:1}^H h_{:1} + \alpha & h_{:1}^H h_{:2} & L & h_{:1}^H h_{:M} \\ h_{:2}^H h_{:1} & h_{:2}^H h_{:2} + \alpha & L & h_{:2}^H h_{:M} \\ M & M & O & M \\ h_{:M}^H h_{:1} & h_{:M}^H h_{:2} & L & h_{:M}^H h_{:M} + \alpha \end{bmatrix}.$$

After the value of $p_1$ which corresponds to the element $y_{p_1}(k)$ with the smallest variance is determined, we can advantageously interchange the $p_1$'th and the M'th entries of the transmitted signal s(k) such that the M'th signal becomes the current best estimate. Of course, in accordance with the illustrative embodiment of the present invention, the indices of the transmitted signals are advantageously tracked after such a reordering. Accordingly, the $p_1$'th and the M'th columns of the channel matrix H are advantageously interchanged. This can, for example, be easily achieved by post-multiplying H with a permutation matrix $P_{p_1 M}$ which is given by:

$$P_{p_1 M} = \begin{bmatrix} 1 & 0 & L & & & L & 0 \\ 0 & O & & & & & M \\ M & & 1 & & & & \\ & & & 0 & L & & 1 \\ & & & M & 1 & & 0 \\ & & & & & O & M \\ & & & & & & 1 & 0 \\ 0 & L & 0 & 1 & 0 & L & 0 & 0 \\ & & & \uparrow & & & \uparrow & \\ & & & p_1 & & & M & \end{bmatrix}_{M \times M}.$$

Since $$(HP_{p_1 M})^H(HP_{p_1 M}) + \alpha I_{M \times M} = P_{p_1 M}(H^H H + \alpha I_{M \times M})P_{p_1 M}, \quad (32)$$

it follows that the rows and columns $p_1$ and M of the matrix R may be advantageously permuted. Equivalently, in accordance with an alternative illustrative embodiment of the present invention, the rows and columns $p_1$ and M of the matrix Q may be permuted. This can be easily seen from the fact that $$(P_{p_1 M} R P_{p_1 M})^{-1} = P_{p_1 M} R^{-1} P_{p_1 M} = P_{p_1 M} Q P_{p_1 M}. \quad (33)$$

Note that these permutations advantageously allow for the removal of the effect of the channel $h_{:p_1}$ quite easily. Specifically:

$$Q_M = \begin{bmatrix} h_{:1}^H h_{:1} + \alpha & h_{:1}^H h_{:2} & L & h_{:1}^H h_{:p_1} \\ h_{:2}^H h_{:1} & h_{:2}^H h_{:2} + \alpha & L & h_{:2}^H h_{:p_1} \\ M & M & O & M \\ h_{:p_1}^H h_{:1} & h_{:p_1}^H h_{:2} & L & h_{:p_1}^H h_{:p_1} + \alpha \end{bmatrix}, \quad (34)$$

$$= \begin{bmatrix} R_{M-1} & v_{M-1} \\ v_{M-1}^H & \beta_{p_1} \end{bmatrix}^{-1}$$

where $$\beta_{p_1} = h_{:p_1}^H h_{:p_1} + \alpha,$$

$$v_{M-1} = \begin{bmatrix} h_{:1}^H h_{:p_1} & h_{:2}^H h_{:p_1} & L & h_{:M-1}^H h_{:p_1} \end{bmatrix}^T,$$

and $$R_{M-1} = H_{M-1}^H H_{M-1} + \alpha I_{(M-1) \times (M-1)}.$$

It can easily be shown that:

$$Q_M = \begin{bmatrix} T_{M-1}^{-1} & -T_{M-1}^{-1} v_{M-1}/\beta_{p_1} \\ -v_{M-1}^H T_{M-1}^{-1}/\beta_{p_1} & 1/\beta_{p_1} + v_{M-1}^H T_{M-1}^{-1} v_{M-1}/\beta_{p_1}^2 \end{bmatrix}, \quad (35)$$

where $$T_{M-1} = R_{M-1} - v_{M-1} v_{M-1}^H / \beta_{p_1} \quad (36)$$

is the Schur complement of $\beta_{p_1}$ in $Q_M^{-1}$. As is well known to those skilled in the art, when a matrix A is partitioned into the form $$A = \begin{bmatrix} E & F \\ G & H \end{bmatrix},$$

then the Schur complement, S, of (partition) H in (matrix) A is $S=E-FH^{-1}G$.

Furthermore, from Equation (36), it may be deduced that:

$$R_{M-1}^{-1} = Q_{M-1} = [T_{M-1} + v_{M-1} v_{M-1}^H / \beta_{p_1}]^{-1} \quad (37)$$

and using the (well-known) Sherman-Morrison formula, we obtain $$Q_{M-1} = T_{M-1}^{-1} - \frac{T_{M-1}^{-1} v_{M-1} v_{M-1}^H T_{M-1}^{-1}}{\beta_{p_1} + v_{M-1}^H T_{M-1}^{-1} v_{M-1}}. \quad (38)$$

Clearly, Equation (38) shows that the matrix Q can be advantageously deflated recursively. Specifically, in the general case:

$$Q_{M-m} = T_{M-m}^{-1} - \frac{T_{M-m}^{-1} v_{M-m} v_{M-m}^H T_{M-m}^{-1}}{\beta_{p_m} + v_{M-m}^H T_{M-m}^{-1} v_{M-m}} \quad (39)$$

$$R_{M-m} = H_{M-m}^H H_{M-m} + \alpha I_{(M-m) \times (M-m)} \quad (40)$$

Note that $R_{M-m}$ may advantageously be easily determined without direct computation. In particular, and in accordance with the illustrative embodiment of the present invention, $R_{M-m}$ is determined from $R_{M+1-m}$ by removing the last line and column thereof—only $R_M=R$ is calculated directly, during the first iteration of the illustrative procedure.

Thus, returning to FIG. 5, the illustrative MIMO decoding technique in accordance with an illustrative embodiment of the present invention comprises the following steps.

Initialization Step (as Shown in Block 50 of the Figure):
Use the training sequence to determine the initial matrix H; determine the received signals x(k) and set $x_1(k)=x(k)$ for the first iteration.

Step 1 (as shown in Block 51 of the Figure):
Compute $R=R_M$ and $Q=Q_M$ recursively—see Equations (26) & (28), above Step 2 (as Shown in Block 52 of the Figure):
The element of y(k) with the highest SNR is detected. This element is associated with the smallest diagonal entry of Q for the MMSE filter. If such a column is $p_m$, then the estimate of the chosen transmitted signal is given by:

$$\hat{s}_{p_m}(k) = Q[y_{p_m}(k)].$$

Step 3 (as Shown in Block 53 of the Figure):
Assuming that $\hat{s}_{p_m}(k) = s_{p_m}(k)$, then $s_{p_m}(k)$ is cancelled from the received vector $x_m(k)$, resulting in a modified received vector, $x_{m+1}(k)$.

Step 4 (as Shown in Block 54 of the Figure):
Assuming that $l_m$ is the index of the chosen transmitted signal, the rows and columns $l_m$ and M−m+1 (the last) are permuted in both $R_{M+1-m}$ and $Q_{M+1-m}$.

Step 5 (as Shown in Block 55 of the Figure):
Partition matrix $R_{M+1-m}$ to determine $R_{M-m}$, $v_{M-m}$, and $\beta_{p_m}$ and remove the last row and column of $Q_{M+1-m}$ to determine $T_{M-m}^{-1}$.

Step 6 (as Shown in Block 56 of the Figure):
Compute $Q_{M-m}$ (recursively) using Equation (39).

Step 7 (as Shown in Block 57 of the Figure):
Unless all M transmitted signals have already been decoded, repeat steps 2–6 for components $p_2, L, p_M$ by operating in turn on the progression of modified received vectors $x_2(k), L, x_M(k)$.

The following more formally summarizes the illustrative MIMO decoding technique in accordance with the illustrative embodiment of the present invention as presented herein:

Initialization and First Iteration:
  $x_1(k)=x(k)$
  Compute $R=R_M$ and $Q=Q_M$ recursively—see Equations (26) & (28)
  $f(k)=[1 2 L M]^T$
  $l_1 = \arg \min q_{M,ii}$, $p_1 = f_{l_1}(k)$ $$y_{p_1}(k) = \sum_{i=1}^{M} q_{M,l_1} h_{:,i}^H x_1(k)$$

Interchange the entries $l_1$ and M of the vector f(k)
  $\hat{s}_{p_1}(k) = Q[y_{p_1}(k)]$ Recursion (Subsequent Iterations), for m=1, 2, K, M−1:
  (a) $x_{m+1}(k) = x_m(k) - \hat{s}_{p_m}(k) h_{p_m}$
  (b) Permute the rows and columns $l_m$ and M−m+1 of $R_{M+1-m}$
  (c) Permute the rows and columns $l_m$ and M−m+1 of $Q_{M+1-m}$
  (d) Determine $R_{M-m}$, $v_{M-m}$, and $\beta_{p_m}$ from $R_{M+1-m}$ as shown above
  (e) Determine $$T_{M-m}^{-1}$$

from $Q_{M+1-m}$ by removing its last row & column
  (f) Compute $Q_{M-m}$ recursively as shown above—see Equation (39)
  (g) $l_{m+1} = \arg \min q_{M-m,ii}$, $p_{m+1} = f_{l_{m+1}}(k)$ $$(h) \ y_{p_{m+1}}(k) = \sum_{i=1}^{M-m} q_{M-m,l_{m+1}} h_{:,f_i(k)}^H x_{m+1}(k)$$

(i) Interchange the entries $l_{m+1}$ and M−m of the vector f(k)
  (j) $\hat{s}_{p_{m+1}}(k) = Q[y_{p_{m+1}}(k)]$ Solutions:
  The estimates of the transmitted signals: $[\hat{s}_{p_1}(k) \hat{s}_{p_2}(k) L \hat{s}_{p_M}(k)]^T$
  The decoding order: $f(k) = [p_M p_{M-1} L p_1]^T$ Addendum to the Detailed Description It should be noted that all of the preceding discussion merely illustrates the general principles of the invention. It will be appreciated that those skilled in the art will be able to devise various other arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

We claim:

1. A method for detecting a plurality, M, of transmitted signals transmitted across a channel by respective transmitting antenna elements in a multiple-input multiple-output MIMO communications system, the method comprising the steps of:

(a) collecting a plurality of received signals from respective receiving antenna elements in said MIMO communications system;

(b) determining a channel matrix H of estimated channel coefficients based on said plurality of received signals;

(c) computing an estimate of a selected one of said plurality of transmitted signals, said estimate based on said plurality of received signals and on an intermediate matrix Q, thereby resulting in detection of the selected one of said plurality of transmitted signals, wherein said intermediate matrix Q is a function of the channel matrix H; and (d) repeating at least step (c) one or more times to detect an additional one or more of said plurality of transmitted signals, wherein said intermediate matrix Q as used in step (c) for each such repeated execution thereof is re-computed based on a function of an inverse of a Schur complement of an element in the inverse of a modified version of the intermediate matrix Q used in the previous execution of step (c).

2. The method of claim 1 further comprising the step of:

modifying one or more of said received signals by at least partially canceling an effect of the detected signal from said received signals based on the computed estimated of said detected signal, and wherein said modified received signals are used in a subsequent repetition of step (c).

3. The method of claim 1 wherein said selected one of said transmitted signals detected in each execution of step (c) is selected in accordance with a preferred order, and wherein said preferred order is based on signal-to-noise ratios of said transmitted signals as determined at each execution of step (c).

4. The method of claim 1 wherein said channel matrix H is initially determined based on a transmission of a predetermined training sequence.

5. The method of claim 1 wherein the intermediate matrix Q as used in step (c) in a first execution thereof is $Q_M = [H_M^H H_M + \alpha I_{M \times M}]^{-1}$, where $H_M$ is the determined channel matrix H, the operator $^H$ represents a conjugate transpose of a matrix, $I_{M \times M}$ represents an M×M identity matrix, and $\alpha$ is a predetermined constant based on a signal-to-noise ratio of the transmitted signals.

6. The method of claim 1 wherein the modified version of the intermediate matrix Q is derived from the intermediate matrix Q by permuting (i) a matrix row and a matrix column which corresponds to said transmitted signal detected by said previous execution of step (c) with (ii) a matrix row and a matrix column which corresponds to a last one of said transmitted signals which has not yet been detected, respectively.

7. The method of claim 6 wherein the intermediate matrix Q as used in step (c) in each repeated execution thereof is $Q = Q_{m-1}$ where $$Q_{m-1} = T_{m-1}^{-1} - \frac{T_{m-1}^{-1} v_{m-1} v_{m-1}^H T_{m-1}^{-1}}{\beta_{PM-m+1} + v_{m-1}^H T_{m-1}^{-1} v_{m-1}},$$

where $$T_{m-1} = R_{m-1} - v_{m-1}v_{m-1}^H/\beta_{P_{M-m+1}}$$

is the Schur complement of $\beta_{P_{M-m+1}}$ in $Q_m^{-1}$, where the operator $^H$ represents a conjugate transpose of a matrix, and where the modified version of the intermediate matrix Q as used in step (c) in each corresponding execution immediately preceding said repeated execution thereof, is $Q_m$ where $$Q_m = \begin{bmatrix} R_{m-1} & v_{m-1} \\ v_{m-1}^H & \beta_{P_{M-m+1}} \end{bmatrix}^{-1}.$$

8. An apparatus for detecting a plurality, M, of transmitted signals transmitted across a channel by respective transmitting antenna elements in a multiple-input multiple-output MIMO communications system, the apparatus comprising:
 a plurality of receiving antenna elements in said MIMO communications system for collecting a corresponding plurality of received signals; and
 a processor adapted to perform the steps of:
 (a) determining a channel matrix H of estimated channel coefficients based on said plurality of received signals;
 (b) computing an estimate of a selected one of said plurality of transmitted signals, said estimate based on said plurality of received signals and on an intermediate matrix Q, thereby resulting in detection of the selected one of said plurality of transmitted signals, wherein said intermediate matrix Q is a function of the channel matrix H; and
 (c) repeating at least step (c) one or more times to detect an additional one or more of said plurality of transmitted signals, wherein said intermediate matrix Q as used in step (b) for each such repeated execution thereof is re-computed based on a function of an inverse of a Schur complement of an element in the inverse of a modified version of the intermediate matrix Q used in the previous execution of step (b).

9. The apparatus of claim 8, wherein said processor is further adapted to perform the additional step of:
 modifying one or more of said received signals by at least partially cancelling an effect of the detected signal from said received signals based on the computed estimated of said detected signal, and wherein said modified received signals are used in a subsequent repetition of step (b).

10. The apparatus of claim 8 wherein said selected one of said transmitted signals detected in each execution of step (b) is selected in accordance with a preferred order, and wherein said preferred order is based on signal-to-noise ratios of said transmitted signals as determined at each execution of step (b).

11. The apparatus of claim 8 wherein said channel matrix H is initially determined based on a transmission of a predetermined training sequence.

12. The apparatus of claim 8 wherein the intermediate matrix Q as used in step (b) in a first execution thereof is $Q_M = [H_M^H H_M + \alpha I_{M \times M}]^{-1}$, where $H_M$ is the determined channel matrix H, the operator $^H$ represents a conjugate transpose of a matrix, $I_{M \times M}$ represents an M×M identity matrix, and α is a predetermined constant based on a signal-to-noise ratio of the transmitted signals.

13. The apparatus of claim 8 wherein the modified version of the intermediate matrix Q is derived from the intermediate matrix Q by permuting
 (i) a matrix row and a matrix column which corresponds to said transmitted signal detected by said previous execution of step (b) with
 (ii) a matrix row and a matrix column which corresponds to a last one of said transmitted signals which has not yet been detected, respectively.

14. The apparatus of claim 8 wherein the intermediate matrix Q as used in step (b) in each repeated execution thereof is $Q=Q_{m-1}$ where $$Q_{m-1} = T_{m-1}^{-1} - \frac{T_{m-1}^{-1} v_{m-1} v_{m-1}^H T_{m-1}^{-1}}{\beta_{P_{M-m+1}} + v_{m-1}^H T_{m-1}^{-1} v_{m-1}},$$

where $$T_{m-1} = R_{m-1} - v_{m-1}v_{m-1}^H/\beta_{P_{M-m+1}}$$

is the Schur complement of $\beta_{P_{M-m+1}}$ in $Q_m^{-1}$, where the operator $^H$ represents a conjugate transpose of a matrix, and where the modified version of the intermediate matrix Q as used in step (b) in each corresponding execution immediately preceding said repeated execution thereof, is $Q_m$ where $$Q_m = \begin{bmatrix} R_{m-1} & v_{m-1} \\ v_{m-1}^H & \beta_{P_{M-m+1}} \end{bmatrix}^{-1}.$$

* * * * *